United States Patent
Yuasa

(10) Patent No.: US 10,332,677 B2
(45) Date of Patent: Jun. 25, 2019

(54) POWER RECEPTION DEVICE AND POWER TRANSMISSION DEVICE

(71) Applicant: TOYOTA JIDOSHA KABUSHIKI KAISHA, Toyota-shi, Aichi-ken (JP)

(72) Inventor: Hiroaki Yuasa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 15/028,548

(22) PCT Filed: Jul. 31, 2014

(86) PCT No.: PCT/JP2014/004025
§ 371 (c)(1),
(2) Date: Apr. 11, 2016

(87) PCT Pub. No.: WO2015/075853
PCT Pub. Date: May 28, 2015

(65) Prior Publication Data
US 2016/0260541 A1  Sep. 8, 2016

(30) Foreign Application Priority Data
Nov. 22, 2013 (JP) .................. 2013-241651

(51) Int. Cl.
*H01F 38/14* (2006.01)
*H02J 5/00* (2016.01)
(Continued)

(52) U.S. Cl.
CPC .............. *H01F 38/14* (2013.01); *B60L 53/12* (2019.02); *B60L 53/36* (2019.02); *B60L 53/38* (2019.02); *H02J 5/005* (2013.01); *H02J 7/025* (2013.01); *H02J 50/12* (2016.02); *H02J 50/80* (2016.02); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC . H01F 38/14; H02J 5/005; H02J 7/025; H02J 50/12
USPC ............................................... 307/104
See application file for complete search history.

(56) References Cited

U.S. PATENT DOCUMENTS 4,223,313 A * 9/1980 Chabrol ............... B25J 9/12
336/123
7,741,734 B2  6/2010 Joannopoulos et al.
(Continued)

FOREIGN PATENT DOCUMENTS

AU  2006269374 B2  1/2007
AU  2007349874 A2  10/2008
(Continued)

*Primary Examiner* — Levi Gannon
(74) *Attorney, Agent, or Firm* — Oliff PLC

(57) ABSTRACT

A power reception device includes a first capacitor and a second capacitor, and first capacitor and second capacitor are arranged to be adjacent to each other on a same side when viewed from a power reception coil, such that a second external electrode faces a fourth external electrode, and first capacitor and second capacitor are arranged such that a distance between second external electrode and fourth external electrode is shorter than a distance between a first external electrode and a third external electrode.

8 Claims, 10 Drawing Sheets

(51) Int. Cl.
*H02J 7/02* (2016.01)
*H02J 50/12* (2016.01)
*H02J 50/80* (2016.01)
*B60L 53/12* (2019.01)
*B60L 53/38* (2019.01)
*B60L 53/36* (2019.01)

(56) References Cited

U.S. PATENT DOCUMENTS

| | | | |
|---|---|---|---|
| 8,823,551 B1 | 9/2014 | Hoffman | |
| 8,922,066 B2* | 12/2014 | Kesler | B60L 11/1812 |
| | | | 307/104 |
| 9,071,063 B2* | 6/2015 | Endo | H02J 5/005 |
| 9,330,837 B2* | 5/2016 | Cuadra | H01F 38/14 |
| 9,524,823 B2* | 12/2016 | Miyashita | H01F 38/14 |
| 9,685,814 B1* | 6/2017 | Moyer | H02J 7/025 |
| 9,705,565 B2* | 7/2017 | Kai | H04B 5/0037 |
| 2007/0222542 A1 | 9/2007 | Joannopoulos et al. | |
| 2008/0278264 A1 | 11/2008 | Karalis et al. | |
| 2009/0146892 A1* | 6/2009 | Shimizu | G06K 19/0723 |
| | | | 343/745 |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0267709 A1 | 10/2009 | Joannopoulos et al. | |
| 2009/0267710 A1 | 10/2009 | Joannopoulos et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0253153 A1* | 10/2010 | Kondo | H01F 27/2876 |
| | | | 307/104 |
| 2010/0264745 A1 | 10/2010 | Karalis et al. | |
| 2011/0266883 A1* | 11/2011 | Eray | H01Q 1/2225 |
| | | | 307/104 |
| 2013/0127409 A1 | 5/2013 | Ichikawa | |
| 2013/0193749 A1 | 8/2013 | Nakamura et al. | |
| 2014/0015327 A1* | 1/2014 | Keeling | B60L 11/182 |
| | | | 307/104 |
| 2014/0021914 A1 | 1/2014 | Martin et al. | |
| 2014/0217966 A1 | 8/2014 | Schneider et al. | |
| 2014/0300201 A1* | 10/2014 | Ichikawa | H02J 5/00 |
| | | | 307/104 |
| 2015/0207330 A1* | 7/2015 | Petersen | H02J 17/00 |
| | | | 307/104 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A | 12/2009 |
| IN | 735/DELNP/2008 | 5/2008 |
| IN | 735/DELNP/2009 | 7/2010 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-135572 A | 7/2013 |
| JP | 2013-146148 A | 7/2013 |
| JP | 2013-146154 A | 7/2013 |
| JP | 2013-154815 A | 8/2013 |
| JP | 2013-169132 A | 8/2013 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |
| WO | 2013/108108 A2 | 7/2013 |

* cited by examiner

POWER RECEPTION DEVICE AND POWER TRANSMISSION DEVICE

TECHNICAL FIELD

The present invention relates to a power reception device and a power transmission device that receive and transmit electric power in a contactless manner.

BACKGROUND ART

As disclosed in PTLs 1 to 6, there are known a power reception device and a power transmission device that receive and transmit electric power in a contactless manner. For example, Japanese Patent Laying-Open No. 2013-154815 (PTL 1: refer to FIG. 9) discloses a power reception device including a power reception coil and a capacitor that are housed in a case. Japanese Patent Laying-Open No. 2013-169132 (PTL 6: refer to FIG. 9) discloses a power reception coil, a capacitor serially connected to the power reception coil, a rectifier, and a filter.

CITATION LIST

Patent Literature

[PTL 1] Japanese Patent Laying-Open No. 2013-154815
[PTL 2] Japanese Patent Laying-Open No. 2013-146154
[PTL 3] Japanese Patent Laying-Open No. 2013-146148
[PTL 4] Japanese Patent Laying-Open No. 2013-110822
[PTL 5] Japanese Patent Laying-Open No. 2013-126327
[PTL 6] Japanese Patent Laying-Open No. 2013-169132

SUMMARY OF INVENTION

Technical Problem

In the aforementioned power reception device and power transmission device that receive and transmit electric power in a contactless manner, there is proposed a method for dividing the capacitor into two. When the capacitor is divided into two, the power reception coil side (the power transmission coil side) and the battery side when viewed from the capacitor can be separated in a direct current manner, which makes it possible to reduce the electrical measures on the battery side with respect to the capacitor.

A voltage difference between electrodes of the capacitors located on the opposing sides of the power reception coil (power transmission coil), specifically a voltage difference between the electrodes connected to opposing ends of the power reception coil, is large, and thus, the need to keep a distance between the capacitors arises. As a result, depending on the manner of mounting the two capacitors and the power reception coil (power transmission coil), upsizing of the power reception device (power transmission device) is a concern.

The present invention has been made in light of the aforementioned problem, and one object is to provide a power reception device including two divided capacitors and including a configuration that can suppress an increase in size of the power reception device while ensuring the electrical insulation between the two capacitors. The other object is to provide a power transmission device including two divided capacitors and including a configuration that can suppress an increase in size of the power transmission device while ensuring the electrical insulation between the two capacitors.

Solution to Problem

This power reception device is a power reception device that receives electric power from a power transmission device in a contactless manner, with the power reception device facing the power transmission device, the power reception device including: a power reception coil; a first capacitor connected to one end of the power reception coil; and a second capacitor connected to the other end of the power reception coil, wherein the first capacitor includes a first external electrode and a second external electrode, and the one end of the power reception coil is connected to the first external electrode, the second capacitor includes a third external electrode and a fourth external electrode, and the other end of the power reception coil is connected to the third external electrode, and the first capacitor and the second capacitor are arranged to be adjacent to each other on a same side when viewed from the power reception coil, such that the second external electrode faces the fourth external electrode, and the first capacitor and the second capacitor are arranged such that a distance between the second external electrode and the fourth external electrode is shorter than a distance between the first external electrode and the third external electrode.

As described above, a voltage difference between the first external electrode and the third external electrode is large. Therefore, the arrangement of the first capacitor and the second capacitor such that the distance between these electrodes is larger than the distance between the second external electrode and the fourth external electrode makes it possible to ensure the electrical insulation between the two capacitors arranged in the power reception device.

Furthermore, the first capacitor and the second capacitor are arranged to be adjacent to each other on the same side when viewed from the power reception coil. As a result, a space around the power reception coil is effectively utilized and an increase in size of the power reception device is suppressed.

This power transmission device is a power transmission device that transmits electric power to a power reception device in a contactless manner, with the power transmission device facing the power reception device, the power transmission device including: a power transmission coil; a first capacitor connected to one end of the power transmission coil; and a second capacitor connected to the other end of the power transmission coil, wherein the first capacitor includes a first external electrode and a second external electrode, and the one end of the power transmission coil is connected to the first external electrode, the second capacitor includes a third external electrode and a fourth external electrode, and the other end of the power transmission coil is connected to the third external electrode, and the first capacitor and the second capacitor are arranged to be adjacent to each other on a same side when viewed from the power transmission coil, such that the second external electrode faces the fourth external electrode, and the first capacitor and the second capacitor are arranged such that a distance between the second external electrode and the fourth external electrode is shorter than a distance between the first external electrode and the third external electrode.

As described above, a voltage difference between the first external electrode and the third external electrode is large. Therefore, the arrangement of the first capacitor and the second capacitor such that the distance between these electrodes is larger than the distance between the second external electrode and the fourth external electrode makes it possible to ensure the electrical insulation between the two capacitors arranged in the power transmission device.

Furthermore, the first capacitor and the second capacitor are arranged to be adjacent to each other on the same side when viewed from the power transmission coil. As a result, a space around the power transmission coil is effectively utilized and an increase in size of the power transmission device is suppressed.

Advantageous Effects of Invention

According to the aforementioned configuration, there can be provided a power reception device and a power transmission device including a configuration that can suppress an increase in size while ensuring the electrical insulation between two capacitors.

DESCRIPTION OF EMBODIMENTS

Figure 1:
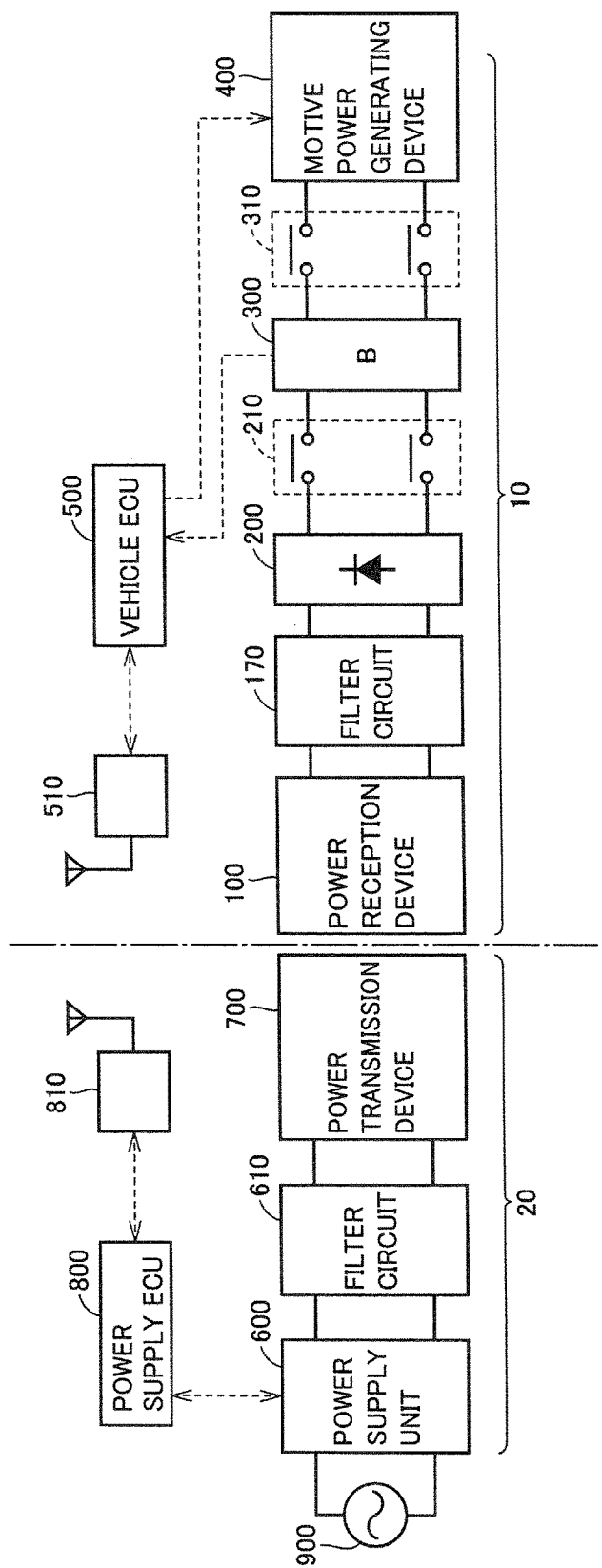
FIG. 1 is an overall configuration diagram of a power transfer system in a first embodiment.

Each embodiment based on the present invention will be described hereinafter with reference to the drawings. When the number, an amount or the like is mentioned in the description of the embodiments, the scope of the present invention is not necessarily limited to that number, that amount or the like, unless otherwise specified. In the description of each embodiment, the same and corresponding components are denoted by the same reference numerals, and redundant description will not be repeated.

First Embodiment

Figure 2:
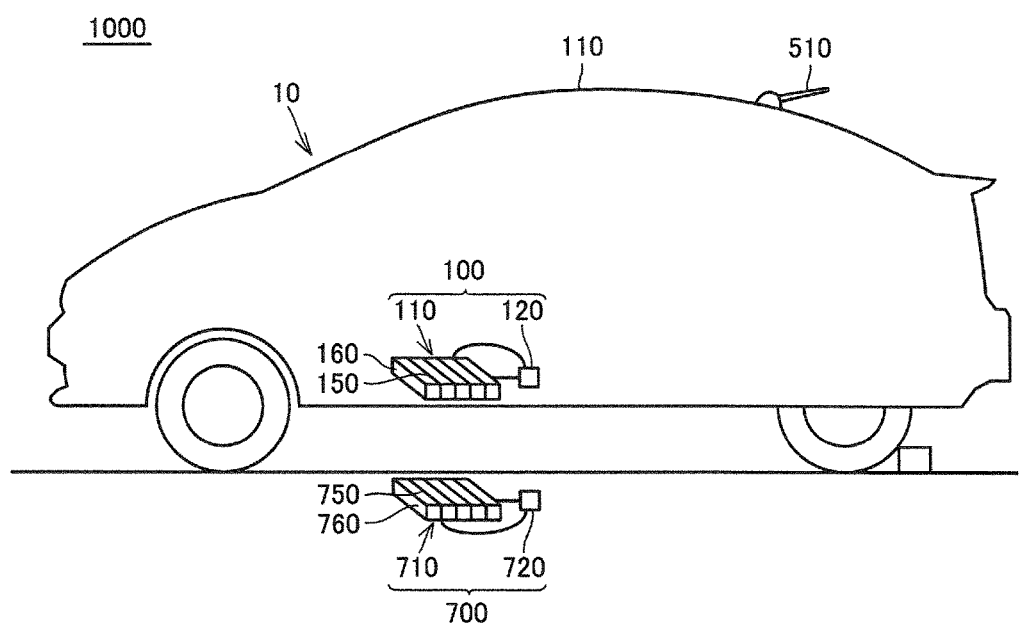
FIG. 2 is a diagram schematically showing a vehicle in the first embodiment.
Figure 3:
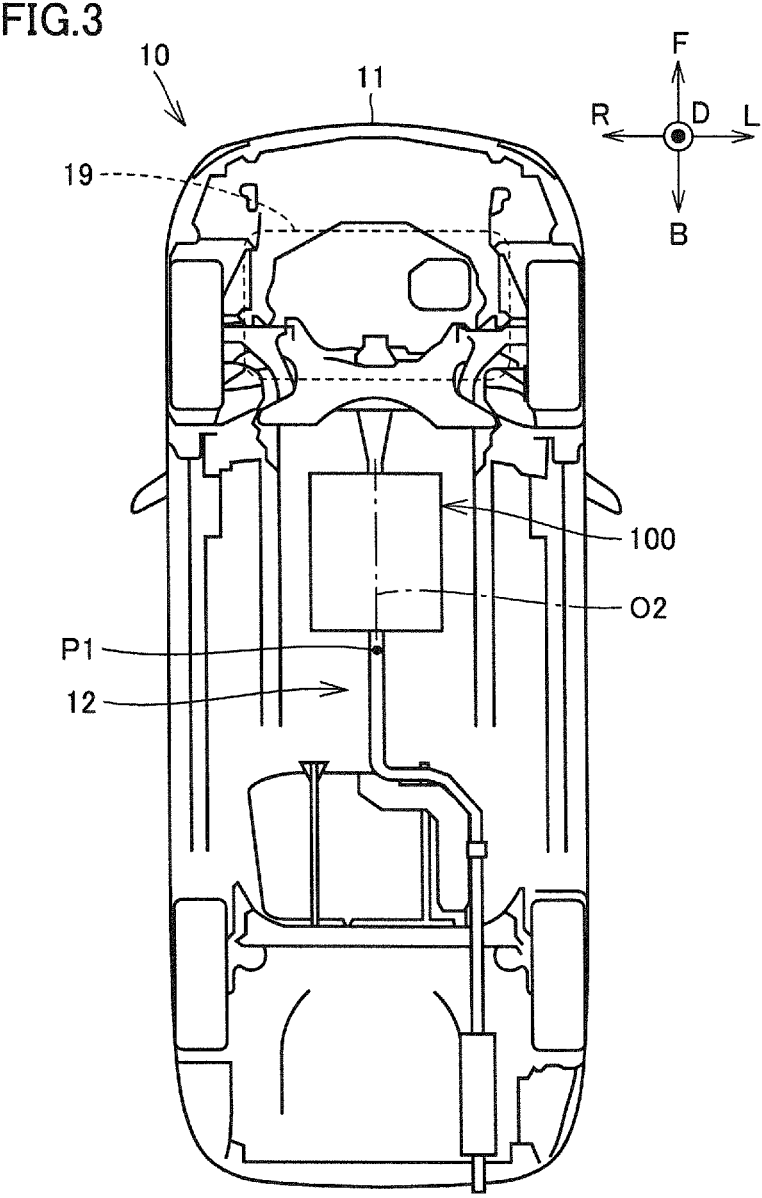
FIG. 3 is a bottom view showing the vehicle in the first embodiment.

FIG. 1 is an overall configuration diagram of a power transfer system in a first embodiment of the present invention. FIG. 2 is a diagram schematically showing a vehicle 10. FIG. 3 is a bottom view showing vehicle 10. Referring to FIG. 1, the power transfer system in the first embodiment includes vehicle 10 and an external power feeding device 20. Vehicle 10 includes a power reception device 100, a filter circuit 170, a rectifying unit 200, a power storage device 300, a motive power generating device 400, and a vehicle ECU (Electronic Control Unit) 500.

Power reception device 100 includes a power reception unit 110 for receiving, in a contactless manner, electric power (AC) output from a power transmission unit 710 of power transmission device 700 (described below). Power reception unit 110 outputs the received electric power to rectifying unit 200. In this first embodiment, as shown in FIGS. 2 and 3, power transmission device 700 is provided on or in the ground, and power reception device 100 is provided on the lower side of the vehicle and close to the vehicle frontward side. Detailed arrangement and configuration of power reception device 100 will be described below.

Rectifying unit 200 rectifies the AC electric power received by power reception device 100, and outputs the electric power to power storage device 300. Filter circuit 170 is provided between power reception device 100 and rectifying unit 200, for suppressing harmonic noises generated during power reception from external power feeding device 20. Filter circuit 170 is formed by a fourth-order LC filter including two inductors and two capacitors.

Power storage device 300 is a rechargeable DC power supply and is formed by a secondary battery such as, for example, a lithium ion secondary battery or a nickel-metal hydride secondary battery. A voltage of power storage device 300 is, for example, approximately 200 V. Power storage device 300 stores the electric power output from rectifying unit 200, and also stores the electric power generated by motive power generating device 400. Power storage device 300 supplies the stored electric power to motive power generating device 400. A large-capacitance capacitor can also be used as power storage device 300. Although not particularly shown, a DC/DC converter for adjusting an output voltage of rectifying unit 200 may be provided between rectifying unit 200 and power storage device 300.

Using the electric power stored in power storage device 300, motive power generating device 400 generates the travel driving force of vehicle 10. Although not particularly shown, motive power generating device 400 includes, for example, an inverter for receiving the electric power from power storage device 300, a motor driven by the inverter, a drive wheel driven by the motor, and the like. Motive power generating device 400 may include a generator for charging power storage device 300, and an engine capable of driving the generator.

Vehicle ECU 500 includes a CPU (Central Processing Unit), a storage device, an input/output buffer and the like (all are not shown). Vehicle ECU 500 receives signals from various sensors, outputs control signals to the devices, and controls the devices in vehicle 10. By way of example, vehicle ECU 500 executes travel control of vehicle 10 and charging control of power storage device 300. These controls are not limited to processing by software and can also be executed by dedicated hardware (electronic circuit).

A relay 210 is provided between rectifying unit 200 and power storage device 300. Relay 210 is turned on by vehicle ECU 500 when power storage device 300 is charged by external power feeding device 20. In addition, a system main relay (SMR) 310 is provided between power storage device 300 and motive power generating device 400. SMR 310 is turned on by vehicle ECU 500 when startup of motive power generating device 400 is requested.

During charging of power storage device 300 by external power feeding device 20, vehicle ECU 500 communicates with external power feeding device 20 by using a communication device 510, so that information such as start/stop of charging and the state of power reception in vehicle 10 is exchanged between vehicle ECU 500 and external power feeding device 20.

External power feeding device 20 includes a power supply unit 600, a filter circuit 610, power transmission device 700, and a power supply ECU 800. Power supply unit 600 receives electric power from an external power supply 900 such as a commercial system power supply, and generates AC electric power having a prescribed transmission frequency.

Power transmission device 700 includes a power transmission coil 750 for transmitting electric power to power reception device 100 of vehicle 10 in a contactless manner. Power transmission device 700 receives the AC electric power having the transmission frequency from power supply unit 600, and transmits the electric power to power reception device 100 of vehicle 10 in a contactless manner through an electromagnetic field formed around power transmission device 700. A detailed configuration of power transmission device 700 will be described below.

Filter circuit 610 is provided between power supply unit 600 and power transmission device 700, for suppressing harmonic noises generated from power supply unit 600. Filter circuit 610 is formed by a fourth-order LC filter including two inductors and two capacitors.

Power supply ECU 800 includes a CPU, a storage device, an input/output buffer and the like (all are not shown). Power supply ECU 800 receives signals from various sensors, outputs control signals to the devices, and controls the devices in external power feeding device 20. By way of example, power supply ECU 800 executes switching control of power supply unit 600 such that power supply unit 600 generates the AC electric power having the transmission frequency. These controls are not limited to processing by software and can also be executed by dedicated hardware (electronic circuit).

During power transmission to vehicle 10, power supply ECU 800 communicates with vehicle 10 by using a communication device 810, so that information such as start/stop of charging and the state of power reception in vehicle 10 is exchanged between power supply ECU 800 and vehicle 10.

In external power feeding device 20, the AC electric power having the prescribed transmission frequency is supplied from power supply unit 600 through filter circuit 610 to power transmission device 700. Each of power transmission device 700 and power reception device 100 of vehicle 10 is designed to include a coil and a capacitor (described below) and resonate at the transmission frequency. A Q value indicating the resonance intensity of power transmission device 700 and power reception device 100 is preferably 100 or larger.

When the AC electric power is supplied from power supply unit 600 through filter circuit 610 to power transmission device 700, the energy (electric power) moves from power transmission device 700 to power reception device 100 through the electro-magnetic field formed between the coil of power transmission device 700 and the coil of power reception device 100. The energy (electric power) moved to power reception device 100 is then supplied to power storage device 300 through filter circuit 170 and rectifying unit 200.

Although not particularly shown, an insulating transformer may be provided between power transmission device 700 and power supply unit 600 (e.g., between power transmission device 700 and filter circuit 610) in external power feeding device 20. In vehicle 10 as well, an insulating transformer may be provided between power reception device 100 and rectifying unit 200 (e.g., between power reception device 100 and filter circuit 170).

(Arrangement of Power Reception Device 100)

One example of arrangement of power reception device 100 will be described with reference to FIG. 3. In FIG. 3, "D" represents a lower side D in the perpendicular direction. "L" represents a vehicle left direction L. "R" represents a vehicle right direction R. "F" represents a vehicle frontward-moving direction F. "B" represents a vehicle backward-moving direction B. "U" represents an upper side U in the perpendicular direction. These are common in below-described figures as well.

Referring to FIG. 3, a vehicle main body 11 of vehicle 10 has a bottom surface 12. Power reception device 100 is provided on bottom surface 12 of vehicle main body 11. Power reception device 100 is arranged more backward (on the vehicle backward-moving direction B side) than an engine 19 in the frontward-backward direction, and more frontward (on the vehicle frontward-moving direction F side) than a center position P1 in the frontward-backward direction.

A coil winding axis O2 of a power reception coil of power reception device 100 extends toward the direction parallel to the frontward-backward direction of vehicle main body 11. It is envisaged that coil winding axis O2 of the power reception coil becomes parallel to a coil winding axis O2 of the power transmission coil when vehicle 10 is parked at a prescribed position in the parking space where power transfer is possible.

(Configuration of Power Reception Device 100)

Figure 4:
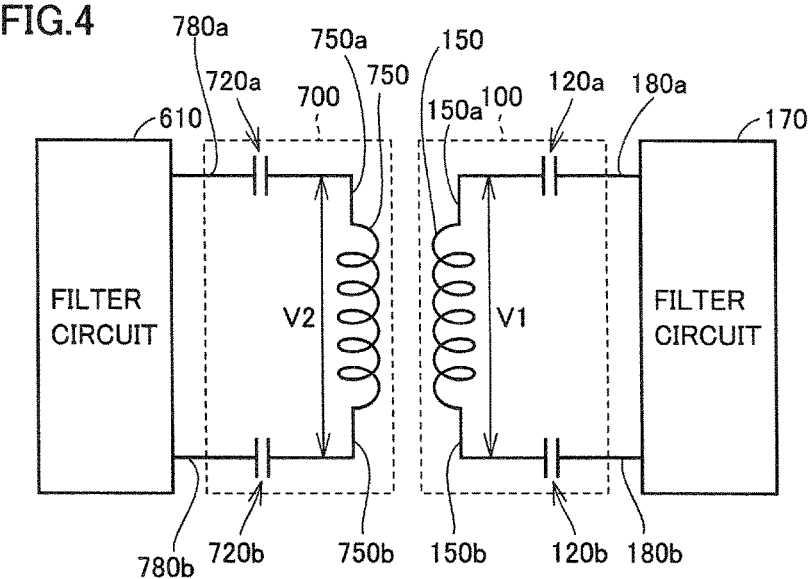
FIG. 4 is a block diagram showing a power reception device and a power transmission device of the power transfer system in the first embodiment.
Figure 5:
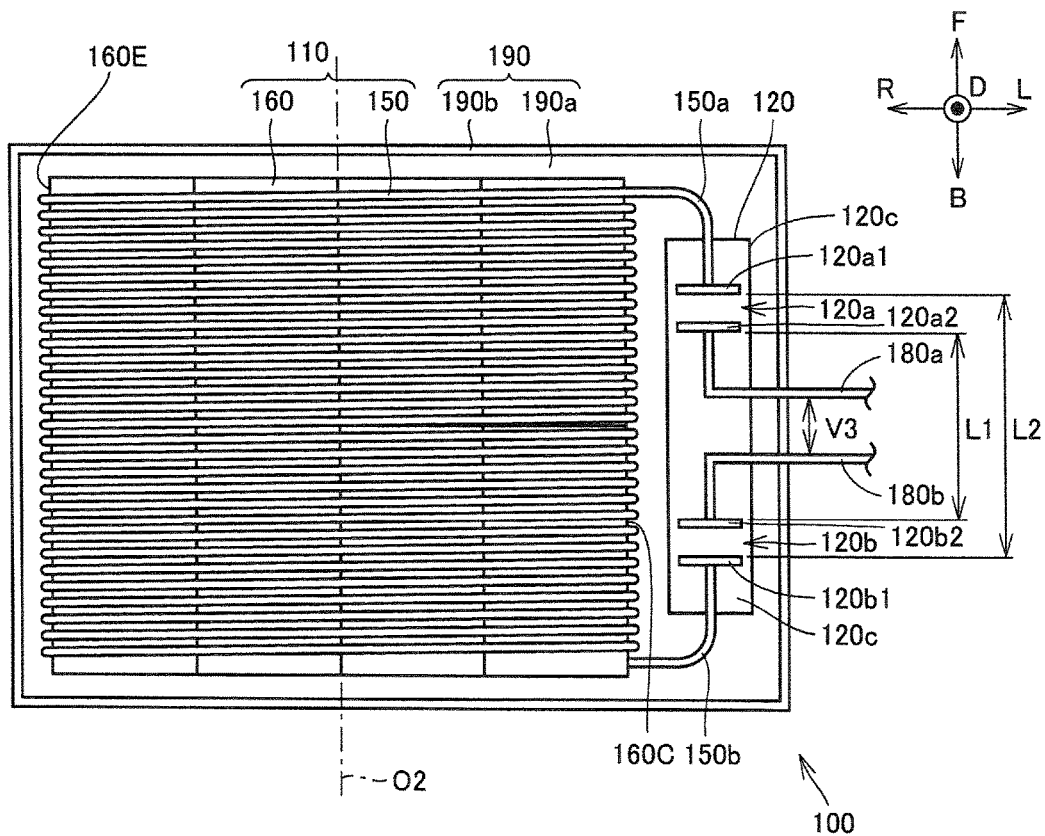
FIG. 5 is a diagram showing the power reception device in the first embodiment.
Figure 6:
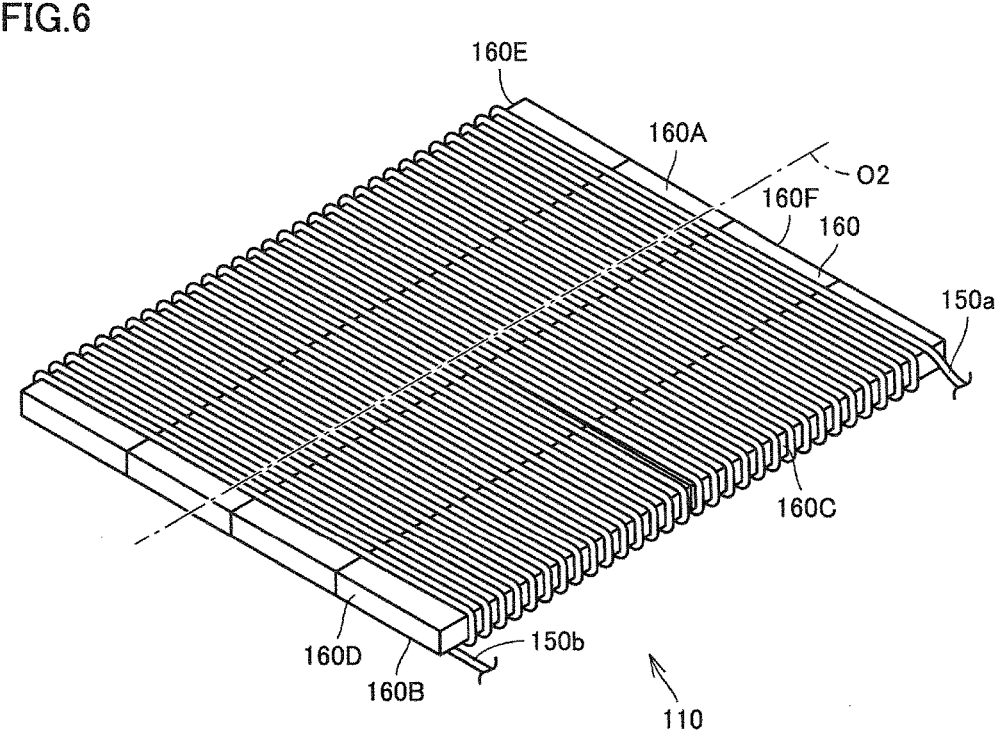
FIG. 6 is a perspective view showing a power reception coil and a core unit used in the power reception device in the first embodiment.

A configuration of power reception device 100 will be described with reference to FIGS. 4 to 8. FIG. 4 is a block diagram showing power reception device 100 and power transmission device 700 in the power transfer system. FIG. 5 is a diagram showing power reception device 100, which corresponds to a diagram when viewed from bottom surface 12 of vehicle 10. FIG. 6 is a perspective view showing a power reception coil 150 and a core unit 160.

Referring to FIGS. 4 and 5, in the present embodiment, power reception device 100 includes: power reception unit 110 having power reception coil 150 and core unit 160; a capacitor 120; and a casing 190. Capacitor 120 has a first capacitor 120a and a second capacitor 120b. First capacitor 120a is connected to one end 150a of power reception coil 150, and second capacitor 120b is connected to the other end 150b of power reception coil 150.

Casing 190 has a shield 190a and a surrounding wall 190b that are arranged on the bottom surface 12 side of vehicle 10. Surrounding wall 190b may be made of a member having a shielding function, or may be made of a resin material that does not have the shielding function. Although not shown, a cover member that covers power reception unit 110 and capacitor 120 and does not have the shielding function may be provided.

Referring to FIG. 6, power reception unit 110 has power reception coil 150 and core unit 160. Core unit 160 is formed to have a plate-like shape including an upper surface 160A, a lower surface 160B, a pair of side surfaces 160C and 160E, and a pair of end surfaces 160D and 160F that are shown in the figure. Upper surface 160A is located on the external power feeding device 20 side, and lower surface 160B is located on the bottom surface 12 side of vehicle 10. In the present embodiment, core unit 160 is formed by combining a plurality of divided cores and surrounding these divided cores by an insulating paper (not shown). Ferrite is used for each of the divided cores.

Coil winding axis O2 passes through end surface 160D and end surface 160F. Power reception coil 150 is spirally wound around a perimeter of core unit 160 including upper surface 160A and lower surface 160B, with coil winding axis O2 centered.

Referring again to FIG. 5, first capacitor 120a and second capacitor 120b are arranged along one side surface 160C of core unit 160. First capacitor 120a and second capacitor 120b may be arranged along the other side surface 160E located on the opposite side. First capacitor 120a includes a first external electrode 120a1 connected to one end 150a of power reception coil 150, and a second external electrode 120a2 located on the opposite side of first external electrode 120a1. A wiring 180a extending to filter circuit 170 is connected to second external electrode 120a2.

Second capacitor 120b includes a third external electrode 120b1 connected to the other end 150b of power reception coil 150, and a fourth external electrode 120b2 located on the opposite side of third external electrode 120b1. A wiring 180b extending to filter circuit 170 is connected to fourth external electrode 120b2.

When capacitor 120 is divided into first capacitor 120a and second capacitor 120b as described above, the power reception coil 150 side and the battery side (the filter circuit 170 side) when viewed from the capacitor can be separated in a direct current manner. As a result, the electrical measures on the battery side with respect to capacitor 120 can be reduced.

However, a voltage difference V1 (refer to FIG. 4) between the electrodes of first capacitor 120a and second capacitor 120b located on the opposing sides of power reception coil 150 is large, and thus, arrangement of first capacitor 120a and second capacitor 120b is important.

Thus, in the present embodiment, first capacitor 120a and second capacitor 120b are arranged on the same substrate 120c to be adjacent to each other on the same side (side surface 160C) when viewed from power reception coil 150, such that second external electrode 120a2 faces fourth external electrode 120b2. Furthermore, first capacitor 120a and second capacitor 120b are arranged such that a distance L1 between second external electrode 120a2 and fourth external electrode 120b2 is shorter than a distance L2 between first external electrode 120a1 and third external electrode 120b1.

As described above, according to power reception device 100 in the present embodiment, the voltage difference between first external electrode 120a1 and third external electrode 120b1 is large, and thus, first capacitor 120a and second capacitor 120b are arranged such that distance L2 between these electrodes is longer than distance L1 between second external electrode 120a2 and fourth external electrode 120b2. As a result, the electrical insulation between the two capacitors arranged in power reception device 100 can be ensured. In addition, a separate member for ensuring the insulation is unnecessary, and thus, an increase in cost can be suppressed.

Furthermore, first capacitor 120a and second capacitor 120b are arranged to be adjacent to each other on the same side (on the one side surface 160C side of core unit 160) when viewed from power reception coil 150.

For example, the present embodiment is compared with the case in which first capacitor 120a is arranged on the one side surface 160C side and second capacitor 120b is arranged on the other side surface 160E side. In this comparative example, a total width of power reception device 100 is determined by a width of capacitor 120a, a width of power reception unit 110 and a width of capacitor 120b.

On the other hand, when both first capacitor 120a and second capacitor 120b are arranged along side surface 160C as in the present embodiment, a total width of power reception device 100 is determined by widths of capacitors 120a and 120b and a width of power reception unit 110. As a result, the power reception device in the present embodiment can be reduced in width by a width of one capacitor, as compared with the power reception device in the aforementioned comparative example.

As described above, a space around power reception coil 150 can be effectively utilized and an increase in size of power reception device 100 can be suppressed. In addition, the size of power reception coil 150 can be maintained or increased without increasing the overall size of power reception device 100, and thus, the power reception efficiency can also be enhanced.

Furthermore, routing of power reception coil 150 is simple, and thus, a length of the wire material required in power reception coil 150 can be shortened. In addition, wirings 180a and 180b extending to filter circuit 170 are drawn out between second external electrode 120a2 and fourth external electrode 120b2 having a small voltage difference, and thus, a voltage difference (V3 in FIG. 5) between wirings 180a and 180b can be reduced.

(Detailed Structure of Capacitor 120)

Figure 7:
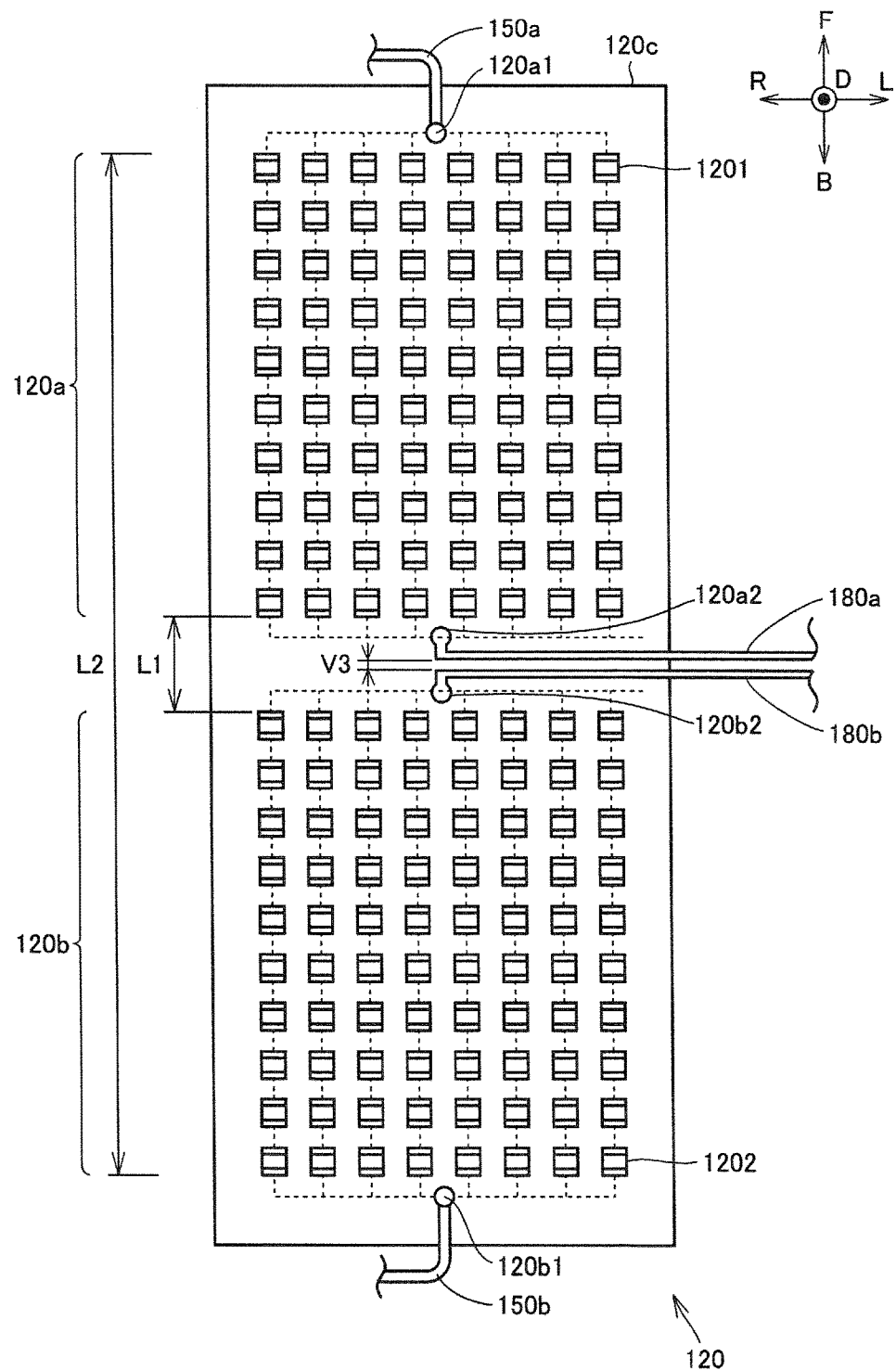
FIG. 7 is a diagram showing a configuration of a capacitor used in the power reception device in the first embodiment.
Figure 8:
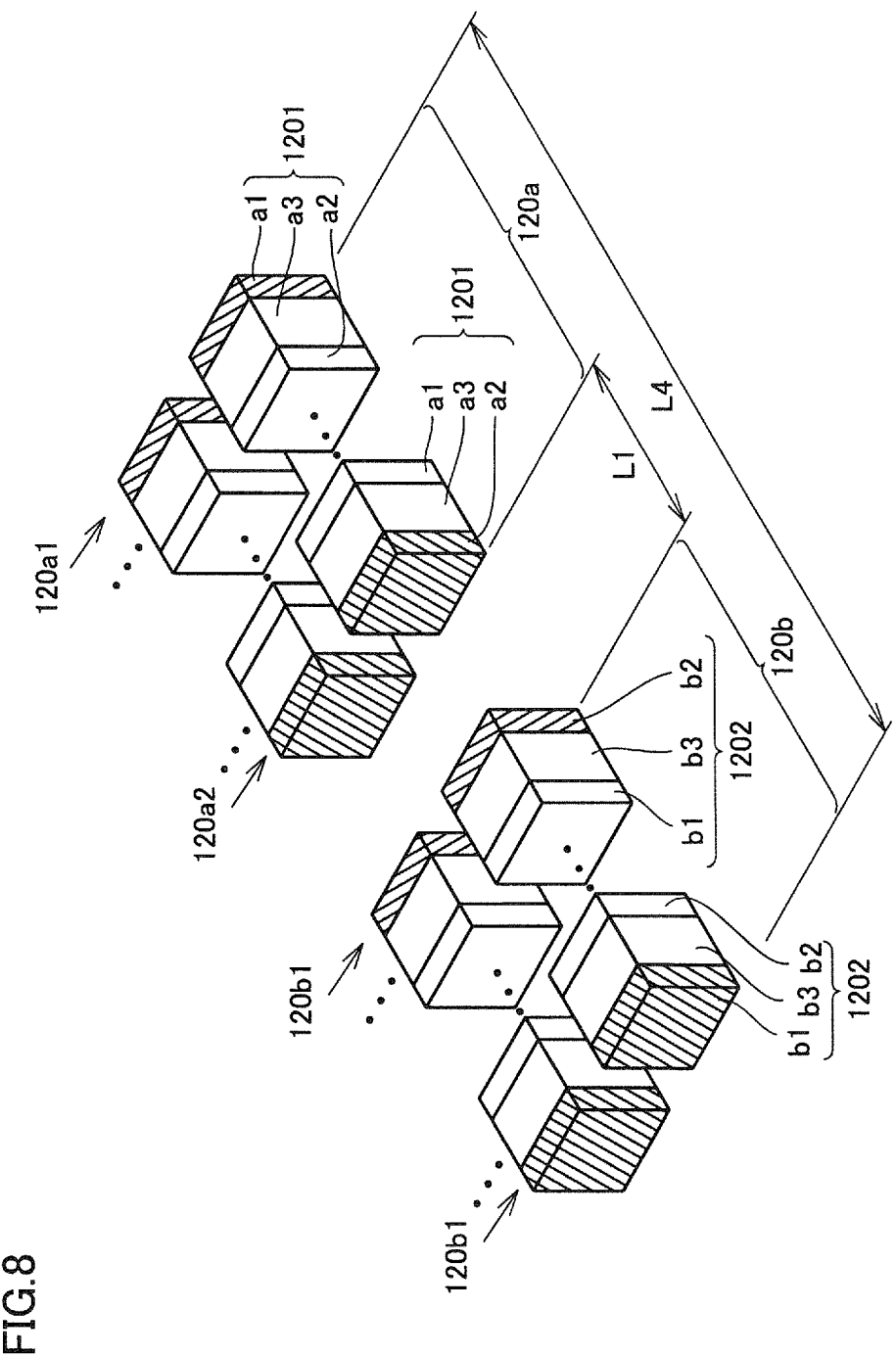
FIG. 8 is a perspective view showing a detailed configuration of the capacitor used in the power reception device in the first embodiment.

Next, one example of a detailed structure of capacitor 120 will be described with reference to FIGS. 7 and 8. FIG. 7 is a diagram showing a configuration of capacitor 120 used in power reception device 100. FIG. 8 is a perspective view showing a detailed configuration of capacitor 120 used in power reception device 100.

As for capacitor 120, first capacitor 120a and second capacitor 120b are disposed on the same substrate 120c as described above. First capacitor 120a has a plurality of first ceramic capacitors 1201. In the present embodiment, a total of 80 first ceramic capacitors 1201 are used in a 8 (F-B direction)×10 (R-L direction) matrix. First ceramic capacitors 1201 arranged in the column (F-B) direction are connected serially.

Similarly, second capacitor 120b also has a plurality of second ceramic capacitors 1202. In the present embodiment, a total of 80 second ceramic capacitors 1202 are used in a 8 (F-B direction)×10 (R-L direction) matrix. Second ceramic capacitors 1202 arranged in the column (F-B) direction are connected serially.

As shown in FIG. 8, each of first ceramic capacitors 1201 forming first capacitor 120a has a cubic shape including external electrodes a1 and a2 and a main body a3. Each of second ceramic capacitors 1202 forming second capacitor 120b also has a cubic shape including external electrodes b1 and b2 and a main body b3. An outer shape of the ceramic capacitor has a size of approximately about 5 mm (height)× about 5 mm (width)×about 5 mm (depth).

When the plurality of ceramic capacitors are used to form the capacitor as described above, first external electrode 120a1 of first capacitor 120a shown in FIG. 5 is formed by all external electrodes a1 (hatching regions in the figure) of first ceramic capacitors 1201 located on the outermost side. Therefore, second external electrode 120a2 of first capacitor 120a is formed by all external electrodes a2 (hatching regions in the figure) of first ceramic capacitors 1201 located on the innermost side.

Similarly, third external electrode 120b1 of second capacitor 120b shown in FIG. 5 is formed by all external electrodes b1 (hatching regions in the figure) of second ceramic capacitors 1202 located on the outermost side. Fourth external electrode 120b2 of second capacitor 120b is formed by all external electrodes b2 (hatching regions in the figure) of second ceramic capacitors 1202 located on the innermost side.

Second Embodiment

Figure 9:
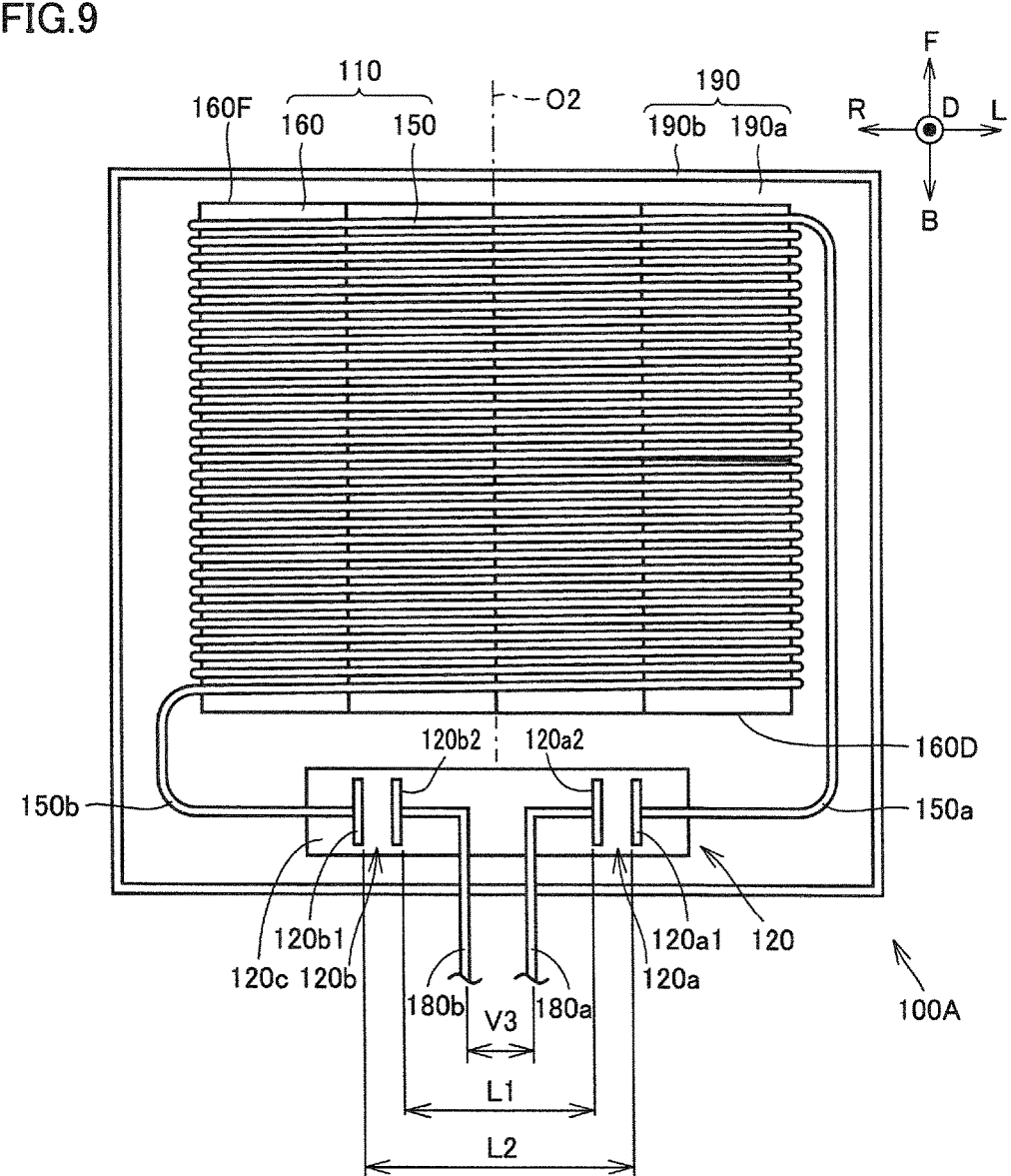
FIG. 9 is a diagram showing a power reception device in a second embodiment.

A configuration of a power reception device 100A in the present embodiment will be described with reference to FIG. 9. FIG. 9 is a diagram showing power reception device 100A in the present embodiment. A difference from the aforementioned first embodiment is only the configuration of the power reception device, and the other configuration is the same.

In power reception device 100A in the present embodiment, first capacitor 120a and second capacitor 120b are arranged along one end surface 160D of core unit 160. First capacitor 120a and second capacitor 120b may be arranged along the other end surface 160F located on the opposite side. The other configuration is the same as that of power reception device 100. Even when this configuration is adopted, the same function and effect as those of power reception device 100 described above can be obtained.

Furthermore, the electromagnetic field generated by power reception coil 150 is generated along coil winding axis O2. Therefore, when first capacitor 120a and second capacitor 120b are arranged as described in the aforementioned first embodiment, the capacitors are arranged along the extending direction of the magnetic field, and thus, the capacitors are likely to be affected by the magnetic field. On the other hand, in the present embodiment, the capacitors can become less likely to be affected by the magnetic field than in the first embodiment.

Third Embodiment

Figure 10:
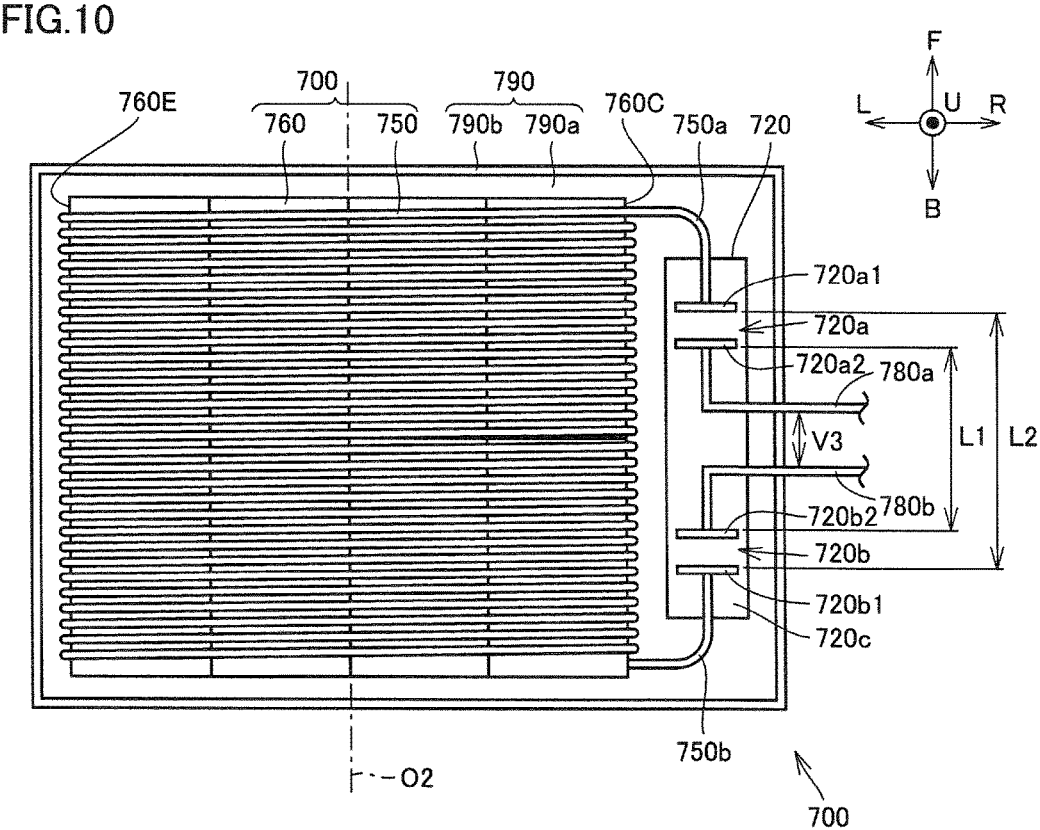
FIG. 10 is a diagram showing a power transmission device in a third embodiment.

Next, power transmission device 700 in the present embodiment will be described with reference to FIG. 10. FIG. 10 is a diagram showing power transmission device 700. FIG. 10 is a plan view when viewed from the vehicle side. Power transmission device 700 has a configuration similar to that of power reception device 100, and includes: power transmission unit 710 having power transmission coil 750 and a core unit 760; a capacitor 720; and a casing 790. Capacitor 720 has a first capacitor 720a and a second capacitor 720b. First capacitor 720a is connected to one end 750a of power transmission coil 750, and second capacitor 720b is connected to the other end 750b of power transmission coil 750.

Casing 790 has a bottom plate 790a and a surrounding wall 790b that are arranged on the underground side. Bottom plate 790a and surrounding wall 790b may be made of a member having a shielding function, or may be made of a material that does not have the shielding function. Although not shown, a cover member that covers power transmission unit 710 and capacitor 720 and does not have the shielding function may be provided.

Power transmission unit 710 has power transmission coil 750 and core unit 760. Core unit 760 has the same shape as that of core unit 160 of power reception unit 110, and is formed to have a plate-like shape including an upper surface 760A, a lower surface 760B, a pair of side surfaces 760C and 760E, and a pair of end surfaces 760D and 760F that are shown in the figure. Upper surface 760A is located on the vehicle 10 side, and lower surface 760B is located on the underground side. In the present embodiment, core unit 760 is formed by combining a plurality of divided cores and surrounding these divided cores by an insulating paper (not shown), similarly to core unit 160 described above. Ferrite is used for each of the divided cores.

Coil winding axis O2 passes through upper surface 760A and lower surface 760B. Power transmission coil 750 is spirally wound around a perimeter of core unit 760 including upper surface 760A and lower surface 760B, with coil winding axis O2 centered.

First capacitor 720a and second capacitor 720b are arranged along one side surface 760C of core unit 760. First capacitor 720a and second capacitor 720b may be arranged along the other side surface 760E located on the opposite side. First capacitor 720a includes a first external electrode 720a1 connected to one end 750a of power transmission coil 750, and a second external electrode 720a2 located on the opposite side of first external electrode 720a1. A wiring 780a extending to filter circuit 610 (refer to FIG. 4) is connected to second external electrode 720a2.

Second capacitor 720b includes a third external electrode 720b1 connected to the other end 750b of power transmission coil 750, and a fourth external electrode 720b2 located on the opposite side of third external electrode 720b1. A wiring 780b extending to filter circuit 610 (refer to FIG. 4) is connected to fourth external electrode 720b2.

When capacitor 720 is divided into first capacitor 720a and second capacitor 720b as described above, the power transmission coil 750 side and the battery side (the filter circuit 610 side) when viewed from the capacitor can be separated in a direct current manner. As a result, the electrical measures on the battery side with respect to capacitor 720 can be reduced.

However, a voltage difference V2 (refer to FIG. 4) between the electrodes of first capacitor 720a and second capacitor 720b located on the opposing sides of power transmission coil 750 is large, and thus, arrangement of first capacitor 720a and second capacitor 720b is important.

Thus, in the present embodiment, first capacitor 720a and second capacitor 720b are arranged on the same substrate 720c to be adjacent to each other on the same side (side surface 760C) when viewed from power transmission coil 750, such that second external electrode 720a2 faces fourth external electrode 720b2. Furthermore, first capacitor 720a and second capacitor 720b are arranged such that a distance L1 between second external electrode 720a2 and fourth external electrode 720b2 is shorter than a distance L2 between first external electrode 720a1 and third external electrode 720b1.

As described above, according to power transmission device 700 in the present embodiment, the voltage difference between first external electrode 720a1 and third external electrode 720b1 is large, and thus, first capacitor 720a and second capacitor 720b are arranged such that distance L2 between these electrodes is longer than distance L1 between second external electrode 720a2 and fourth external electrode 720b2. As a result, the electrical insulation between the two capacitors arranged in power transmission device 700 can be ensured. In addition, a separate member for ensuring the insulation is unnecessary, and thus, an increase in cost can be suppressed.

Furthermore, first capacitor 720a and second capacitor 720b are arranged to be adjacent to each other on the same side (on the one side surface 760C side of core unit 760) when viewed from power transmission coil 750. As a result, a space around power transmission coil 750 can be effectively utilized and an increase in size of power transmission device 700 can be suppressed. In addition, the size of power transmission coil 750 can be maintained or increased without increasing the overall size of power transmission device 700, and thus, the power transmission efficiency can also be enhanced.

Furthermore, routing of power transmission coil 750 is simple, and thus, a length of the wire material required in power transmission coil 750 can be shortened. In addition, wirings 780a and 780b extending to filter circuit 610 are drawn out between second external electrode 720a2 and fourth external electrode 720b2 having a small voltage difference, and thus, a voltage difference (V3 in FIG. 10) between wirings 780a and 780b can be reduced.

The detailed structure of capacitor 720 is the same as the aforementioned configuration shown in FIG. 8, and thus, description using the figure will not be repeated. Similarly to the first embodiment, each of first capacitor 720a and second capacitor 720b is formed by a plurality of ceramic capacitors.

Fourth Embodiment

Figure 11:
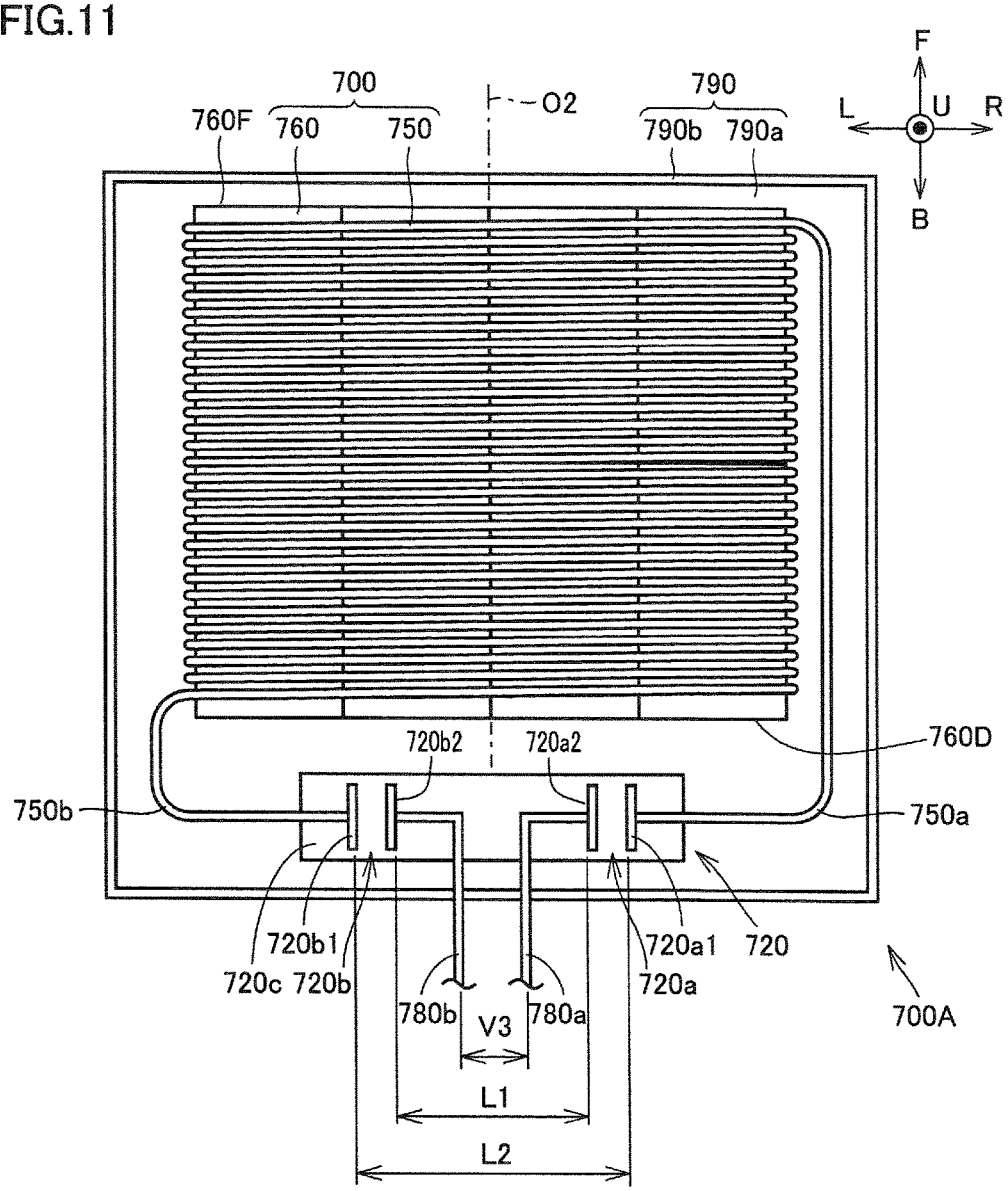
FIG. 11 is a diagram showing a power transmission device in a fourth embodiment.

A configuration of a power transmission device 700A in the present embodiment will be described with reference to FIG. 11. FIG. 11 is a diagram showing power transmission device 700A in the present embodiment. A difference from the aforementioned third embodiment is only the configuration of the power transmission device, and the other configuration is the same.

In power transmission device 700A in the present embodiment, first capacitor 720a and second capacitor 720b are arranged along one end surface 760D of core unit 760. First capacitor 120a and second capacitor 120b may be arranged along the other end surface 760F located on the opposite side. The other configuration is the same as that of power transmission device 700. Even when this configuration is adopted, the same function and effect as those of power transmission device 700 described above can be obtained.

Furthermore, the electromagnetic field generated by power transmission coil 750 is generated along coil winding axis O2. Therefore, when first capacitor 720a and second capacitor 720b are arranged as described in the aforementioned third embodiment, the capacitors are arranged along the extending direction of the magnetic field, and thus, the capacitors are likely to be affected by the magnetic field. On the other hand, in the present embodiment, the capacitors can become less likely to be affected by the magnetic field than in the third embodiment.

In the aforementioned embodiments, the figures show the case in which power reception unit 110 is housed in casing 190 and power transmission unit 710 is housed in casing 790. However, in both power reception unit 110 and power transmission unit 710, resin sealing may be performed to eliminate the need for the casing or simplify the casing.

In addition, in the description of the embodiments, the ceramic capacitors arranged in a 8 (F-B direction)×10 (R-L direction) matrix have been used as the specific configuration of the capacitor. However, the number of the ceramic capacitors is not limited to that number and is changed as appropriate in accordance with the design specifications. In addition, the capacitor is not limited to the ceramic capacitor, and a capacitor having an equivalent function may be used.

Although the embodiments have been described above, the embodiments disclosed herein are illustrative and not limitative in any respect. The technical scope of the present invention is defined by the terms of the claims, and is intended to include any modifications within the scope and meaning equivalent to the terms of the claims.

REFERENCE SIGNS LIST

10 vehicle; 11 vehicle main body; 12 bottom surface; 19 engine; 20 external power feeding device; 100, 100A power reception device; 110 power reception unit; 120, 720 capacitor; 120a, 720a first capacitor; 120a1 first external electrode; 120a2 second external electrode; 120b, 720b second capacitor; 120b1, 720b1 third external electrode; 120b2, 720b2 fourth external electrode; 120c substrate; 1201 first ceramic capacitor; 1202 second ceramic capacitor; 150 power reception coil; 150a, 750a one end; 150b, 750b the other end; 160, 760 core unit; 160A, 760A upper surface; 160B, 760B lower surface; 160C, 160E, 760C, 760E side surface; 160D, 160F, 760D, 760F end surface; 170, 610 filter circuit; 180a, 180b, 780a, 780b wiring; 190, 790 casing; 190a shield; 190b, 790b surrounding wall; 200 rectifying unit; 210 relay; 300 power storage device; 310 system main relay (SMR); 400 motive power generating device; 500 vehicle ECU; 510 communication device; 600 power supply unit; 610 filter circuit; 700, 700A power transmission device; 710 power transmission unit; 750 power transmission coil; 790a bottom plate; 800 power supply ECU; 810 communication device; 900 external power supply; a1, a2, b1, b2 external electrode; a3, b3 main body; P1 center position; O2 coil winding axis.

The invention claimed is:

1. A power reception device that receives electric power from a power transmission device in a contactless manner, with said power reception device facing said power transmission device, said power reception device comprising:
    a power reception coil;
    a first capacitor connected to one end of said power reception coil; and
    a second capacitor connected to the other end of said power reception coil; and
    a core unit including an upper surface, a lower surface, a pair of side surfaces, and a pair of end surfaces, wherein
    said power reception coil is wound around said core unit, with a coil winding axis through both of said end surfaces serving as an axis,
    said first capacitor includes a first external electrode and a second external electrode, said one end of said power reception coil is connected to said first external electrode, and said second external electrode is connected to one end of a filter circuit,
    said second capacitor includes a third external electrode and a fourth external electrode, said other end of said power reception coil is connected to said third external electrode, and said fourth external electrode is connected to another end of said filter circuit, and
    said first capacitor and said second capacitor are arranged to be adjacent to each other on a same side when viewed from said power reception coil, such that said second external electrode faces said fourth external electrode, and said first capacitor and said second capacitor are arranged such that a distance between said second external electrode and said fourth external electrode is shorter than a distance between said first external electrode and said third external electrode.

2. The power reception device according to claim 1, wherein
    the core unit is made of ferrite, and is formed to have a plate-like shape,
    said first capacitor and said second capacitor are arranged along one of said side surfaces of said core unit.

3. The power reception device according to claim 1, wherein
the core unit is made of ferrite, and is formed to have a plate-like shape,
said first capacitor and said second capacitor are arranged along one of said end surfaces of said core unit.

4. The power reception device according to claim 2, wherein
said first capacitor includes a plurality of first ceramic capacitors connected serially,
said second capacitor includes a plurality of second ceramic capacitors connected serially, and
said plurality of first ceramic capacitors and said plurality of second ceramic capacitors are mounted on one substrate.

5. A power transmission device that transmits electric power to a power reception device in a contactless manner, with said power transmission device facing said power reception device, said power transmission device comprising:
a power transmission coil;
a first capacitor connected to one end of said power transmission coil;
a second capacitor connected to the other end of said power transmission coil; and
a core unit including an upper surface, a lower surface, a pair of side surfaces, and a pair of end surfaces, wherein said power transmission coil is wound around said core unit, with a coil winding axis through both of said end surfaces serving as an axis,
said first capacitor includes a first external electrode and a second external electrode, said one end of said power transmission coil is connected to said first external electrode, and said second external electrode is connected to one end of a filter circuit,
said second capacitor includes a third external electrode and a fourth external electrode, and said other end of said power transmission coil is connected to said third external electrode, and said fourth external electrode is connected to another end of said filter circuit, and
said first capacitor and said second capacitor are arranged to be adjacent to each other on a same side when viewed from said power transmission coil, such that said second external electrode faces said fourth external electrode, and said first capacitor and said second capacitor are arranged such that a distance between said second external electrode and said fourth external electrode is shorter than a distance between said first external electrode and said third external electrode.

6. The power transmission device according to claim 5, wherein
the core unit is made of ferrite, and is formed to have a plate-like shape,
said first capacitor and said second capacitor are arranged along one of said side surfaces.

7. The power transmission device according to claim 5, wherein
the core unit is made of ferrite, and is formed to have a plate-like shape,
said first capacitor and said second capacitor are arranged along one of said end surfaces.

8. The power transmission device according to claim 6, wherein
said first capacitor includes a plurality of first ceramic capacitors connected serially,
said second capacitor includes a plurality of second ceramic capacitors connected serially, and
said plurality of first ceramic capacitors and said plurality of second ceramic capacitors are mounted on one substrate.

* * * * *